(12) United States Patent
Doré et al.

(10) Patent No.: US 11,968,991 B2
(45) Date of Patent: Apr. 30, 2024

(54) METHOD AND SYSTEM FOR PRODUCING WHEY PROTEIN AGGREGATES

(71) Applicants: TBB Holdings Inc., Richmond Hill (CA); Ly-Innova Solution Inc., Ottawa (CA); Gestions Michel Doré Inc., Embrun (CA)

(72) Inventors: Michel Doré, Embrun (CA); Ying Li, Nepean (CA); Joseph Borgo, Richmond Hill (CA)

(*) Notice: Subject to any disclaimer, the term of this patent is extended or adjusted under 35 U.S.C. 154(b) by 0 days.

(21) Appl. No.: 17/902,185

(22) Filed: Sep. 2, 2022

(65) Prior Publication Data

US 2023/0070565 A1    Mar. 9, 2023

Related U.S. Application Data

(60) Provisional application No. 63/240,624, filed on Sep. 3, 2021, provisional application No. 63/326,603, filed on Apr. 1, 2022.

(51) Int. Cl.
| | |
|---|---|
| *A23C 21/10* | (2006.01) |
| *A23C 9/12* | (2006.01) |
| *A23C 19/00* | (2006.01) |
| *A23J 3/08* | (2006.01) |

(52) U.S. Cl.
CPC ............... *A23C 21/10* (2013.01); *A23C 9/12* (2013.01); *A23C 19/00* (2013.01); *A23J 3/08* (2013.01)

(58) Field of Classification Search
CPC . A23C 21/10; A23C 9/12; A23C 19/00; A23J 3/08
USPC .......................................................... 426/656
See application file for complete search history.

(56) References Cited

U.S. PATENT DOCUMENTS

| | | | |
|---|---|---|---|
| 4,734,287 A | | 3/1988 | Singer et al. |
| 5,413,804 A | * | 5/1995 | Rhodes ..................... A23J 3/10 |
| | | | 426/89 |
| 6,767,575 B1 | | 7/2004 | Huss et al. |
| 2016/0262424 A1 | | 9/2016 | Mikkelsen et al. |

OTHER PUBLICATIONS

Extended European Search Report issued on corresponding EP Application No. 22193765.9 dated Jan. 26, 2023, 11 pages.

\* cited by examiner

*Primary Examiner* — Brent T O'Hern
(74) *Attorney, Agent, or Firm* — Louis B. Allard (57) ABSTRACT

Processes and systems are provided for aggregating whey protein including preparing a whey protein solution containing native whey protein, adjusting the pH of the whey protein solution, denaturing at least a portion of the native whey protein, separating the denatured material and processing the denatured material by shearing to form whey protein aggregates. Also provided are whey protein aggregates and uses thereof, such as in the production of dairy products or in cheesemaking.

13 Claims, 5 Drawing Sheets

METHOD AND SYSTEM FOR PRODUCING WHEY PROTEIN AGGREGATES

FIELD

The present disclosure relates to whey protein. In particular, the present disclosure relates to whey protein aggregates and uses thereof, as well as processes and systems for producing whey protein aggregates.

BACKGROUND

Whey is a by-product in the manufacture of cheese or casein; it is the liquid remaining after milk has been curdled and strained. New uses for whey, and improvements to cheesemaking processes are desirable.

SUMMARY

In accordance with the present disclosure, there is provided a process for aggregating whey protein. The process comprises obtaining a whey protein solution containing native whey protein and denaturing at least a portion of the native whey protein present in the whey protein solution to obtain a denatured whey protein mixture. The denatured whey protein mixture contains water insoluble whey protein material. The process also comprises separating the water insoluble whey protein material from the denatured whey protein mixture, extruding the water insoluble whey protein material to obtain extruded whey protein material, and cutting the extruded whey protein material to obtain whey protein aggregates.

In some embodiments, obtaining the whey protein solution may include preparing the whey protein solution by mixing whey protein concentrate powder in water to a concentration of about 13% to about 18% total solids to obtain the whey protein solution.

In some embodiments, obtaining the whey protein solution may include preparing the whey protein solution by mixing whey protein retentate in water to a concentration of about 13% to about 18% total solids to obtain the whey protein solution.

In some embodiments mixing may conducted for about 15 minutes at a temperature of about 60° C.

In some embodiments, the process may include adjusting a mineral balance of whey protein solution. Adjusting the mineral balance of the whey protein solution may include adding $CaCl_2$ to the whey protein solution. Adding $CaCl_2$ to the whey protein solution may include adding about 0.4% of $CaCl_2$. Adding $CaCl_2$ to the whey protein solution may include adding from about 1400 ppm to about 1600 ppm of $CaCl_2$ to the whey protein solution.

In some embodiments, the process may include adjusting a pH of the whey protein solution to a pH value comprised between about 5.6 to about 6.2. Adjusting the pH of the whey protein solution may includes adding lactic acid to the whey protein solution.

In some embodiments, the process may include hydrating the whey protein solution at a temperature of about 60° C. for a duration of about 20 minutes.

In some embodiments, denaturing at least a portion of the native whey protein present in the whey protein solution includes heating the whey protein solution to a temperature from about 90° C. to about 92° C. for a duration of about 10 minutes to about 15 minutes, to obtain the denatured whey protein mixture. Heating the whey protein solution may include injecting steam into the whey protein solution.

In some embodiments, separating the water insoluble whey protein material from the denatured whey protein mixture includes filtering the whey protein mixture to obtain the water insoluble whey protein material. Filtering may include filtering using a cloth filter, a mesh or screen separator, a clarifier, or a perforated conveyor belt.

In some embodiments, cutting the extruded whey protein material may include subjecting the whey protein material to a shearing process. In some embodiments, whey protein aggregates are output whey protein aggregates and the shearing process may include subjecting the extruded whey protein material to a first shearing step to obtain intermediate whey protein aggregates and subjecting the intermediate whey protein aggregates to a second shearing step to obtain the output whey protein aggregates, the output whey aggregates being smaller than the intermediate whey aggregates.

In some embodiments, the process may include cooling the whey protein aggregates to a temperature of about 10° C. to obtain cooled whey protein aggregates. In some embodiments, the process may include storing the whey protein aggregates.

In accordance with the present disclosure, there is provided a use of the whey protein aggregates obtained using any process of the present disclosure to obtain a dairy product. In some embodiments, the dairy product may be one of cheese and yogurt.

In accordance with the present disclosure, there is provided a system for producing whey protein aggregates. The system comprises a heating tank configured to heat a whey protein solution to a target temperature and for a target duration to obtain a whey protein mixture comprising water insoluble whey protein material. The system also comprises a filter configured to filter out the water insoluble whey protein material from the whey protein mixture. The system also comprises an extruder configured to extrude the water insoluble whey protein material to obtain extruded whey protein material, and a shearing device configured to shear the extruded whey protein material to produce the whey protein material.

In some embodiments, the system may include a steam generator coupled to the heating tank. The steam generator is configured to inject steam in the whey protein solution.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method for forming whey protein aggregates. The whey protein aggregates produced by the process can be used as water retaining elements and/or as fat globules retaining elements in manufactured dairy products such as cheese and yogurt.

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Whey Protein Solutions.

Whey protein is the collection of globular proteins isolated from whey, and may include beta-lactoglobulin, alpha-lactalbumin, serum albumin, and immunoglobulins. Native whey protein contains whey proteins in their native state (i.e., where the whey proteins have not been denatured or otherwise degraded). In some embodiments of the present disclosure, the processes and systems herein disclosed are relevant to whey protein solutions comprising at least a portion of native whey protein. In one or more embodiments, the whey protein solution may be prepared by diluting or hydrating a whey protein concentrate, such as a whey protein concentrate (WPC) powder (e.g. WPC 80 powder). In one or more embodiments, the whey protein solution may be a whey protein retentate liquid base. As used herein, whey protein retentate refers to whey protein that has been concentrated by any suitable means, such as by ultrafiltration or membrane filtration. In one or more embodiments, the whey protein solution may be prepared by concentrating or diluting a source of whey protein to a desired protein concentration. In one or more embodiments, the whey protein solution may comprise about 5% to about 20% whey protein by weight. The whey protein solution may be derived from dairy milk, or from any suitable source (e.g. sheep, goat or buffalo).

As used herein, the expression whey protein concentrate (WPC) aggregates may be used interchangeably to refer to whey protein aggregates of the present disclosure, regardless of whether the whey protein aggregate was formed from a whey protein concentrate or otherwise (e.g., from a whey protein retentate solution).

Additives.

In embodiments of the present disclosure, the mineral balance of the whey protein may be adjusted, such as by adding calcium chloride. In one or more embodiments, calcium chloride may be added to the whey protein solution, such as in a concentration of 0.3% to 1% or 1000-2000 ppm.

Hydration Process.

In one or more embodiments, obtaining or preparing the whey protein solution may include a hydration step. The hydration step may include diluting a whey protein concentrate, retentate, or powder in water. In one or more embodiments, whey protein concentrate powder may be dissolved in water to a target concentration of total solids. The target concentration of total solids may be about 13% to about 18%. In one or more embodiments, the hydration step includes heating the whey protein solution to a temperature and for an amount of time sufficient to dissolve and hydrate at least a portion of the whey protein, such as to a temperature of about 60° C. for 15 minutes. The hydration step may be done in the presence of calcium chloride.

pH Adjustment.

In some embodiments, the pH of the whey protein solution is adjusted to a target pH value prior to heating the whey protein solution. The target pH value can be 5.8, or a value in the range of 5.6 to 6.2, or any other suitable target pH value. Adjusting the pH value can be achieved by adding/ dissolving lactic acid to the whey protein solution. Adjusting the pH value can be achieved by adding/dissolving any suitable additive. Adjusting the pH value can be achieved by adding/dissolving an acid selected from: lactic acid, citric acid, and glucono delta-lactone. It will be understood that any suitable means of adjusting the pH may be used, and depending upon the purpose, the pH may be adjusted using a suitable food-grade additive.

Denaturation Process.

In some embodiments, the process for forming whey protein aggregates includes heating a whey protein solution to a target temperature. Heating the solution causes denaturation of proteins present in the solution and results in a denatured whey protein solution. The denatured whey protein solution contains soluble components/material and insoluble components/material. The target temperature may be in the range of about 85° C. to about 95° C., such as about 92° C. The target temperature may be held for a suitable amount of time, such as about of 5 to 30 minutes, 10-15 minutes.

It will be understood that any suitable means of heating could be used in the denaturation process, such as direct steam injection or the use of a jacketed vat. In one or more embodiments, direct steam injection is used in the denaturation process. The direct heat of steam injection during heating and denaturation process may be beneficial in that it results zero loss of mass in the equipment without fouling defects.

Concentration.

Subsequent the heating of the solution, soluble components/material of the whey protein solution are separated from the insoluble components/material. The phase separation can be achieved through any suitable process such as a filtration process (e.g. cloth filtration). For example, the phase separation can be achieved using a mesh or screen separator, a clarifier, or a perforated conveyor belt. It will be understood that phase separation can be carried out using any suitable means for removing the denatured whey protein from the solution.

Processing.

After concentration/phase separation, the insoluble whey protein material can then be subjected to further processing to form whey protein aggregates. In one or more embodiments, the water insoluble whey protein material is subjected to an extrusion process to obtain extruded whey material. An extrusion process may be used to aid in transferring the viscous material to the shearing process. It will be understood that any suitable means of transferring may be used.

The transferred or extruded whey protein material may then be mechanically processed to produce the whey protein aggregates. The mechanical process can include passing the denatured whey protein material though a shearing unit such as a multiple stage shear pump (e.g. a three-stage shear pump).

The size of the whey protein aggregates can be controlled by controlling the shearing parameters of the shearing unit (e.g., the speed of the three-stage shear pump) and, when smaller size whey protein aggregates are desired, by subjecting the whey protein aggregates to one or more pass through the sheer device. Alternatively, the whey protein aggregates can be subjected to a different shearing unit configured to obtain smaller size whey protein aggregates.

Whey Protein Aggregate Properties.

For a given weight of whey protein aggregates, smaller whey protein aggregates will have more surface area than larger whey protein aggregates. The increased surface area may provide one or more of the following advantages: increased water holding capacity, increased water binding capacity, or higher aggregation rate. As in know in the art, the whey protein aggregates may improve the protein yield and strength of protein interaction (hydrophobic protein interaction is the dominant interaction).

As will be understood by the skilled worker, varying the heating time and the heating temperature of the whey protein solution may have an effect on the properties of the insoluble whey protein material, which, if every other aspect of the process are maintained, can affect the size of the whey aggregates. The extrusion parameters and the rate at which the extruded whey protein material is provided to the shearing unit may also have an effect on the size of the whey protein aggregates. For example, varying the extrusion rate and/or varying the extrusion pressure may affect the size and the size distribution of the aggregates.

When the whey protein aggregates have the desired size or are within a desired size range, they can be cooled to any suitable temperature (e.g., 10 Celsius) using any suitable cooling process and then refrigerated until required.

Functionality of the whey protein aggregates and application in cheese making.

The functionality of the whey protein aggregates depends on the size and the size distribution of the whey protein aggregates.

The functionality of whey protein aggregates obtained using the process described herein can reach 100% aggregation rate, for example, 0.84 g water holding capacity per 1 g of aggregates, and 0.48 g additional water per 1 g of aggregates absorption capacity.

The whey protein aggregates can be used to replace casein (casein micelles) in the production of cheese. The whey protein aggregates with high water retention have high protein interactions in the cheese matrix, so the whey protein aggregates can replace casein, as the main milk protein, in the cheese matrix. In addition, the whey protein aggregates can improve the cheese yield and increase the cheese quality.

The aggregates can have different functionality (solubility, aggregation rate, water binding capacity, water holding capacity and so on) depending on size and distribution generated by the selected processing conditions.

The functionality of whey protein aggregates in this invention can reach 100% aggregation rate, and 100% water holding capacity (0.84 g water holding capacity per 1 g of aggregates), and 0.47 g additional water per 1 g of aggregates absorption capacity.

In one or more embodiments, the particle size of the whey protein aggregates is around avg 2.3 um (1.5-3 um), like fat globules.

When used in cheesemaking, the whey protein aggregates herein disclosed may be distributed homogeneously and continuously in the cheese protein matrix. In one or more examples, there is positive regression between the concentration of WPC addition and WPC aggregates imbedded in the cheese matrix; more aggregates were added, more WPC were imbedded in the protein matrix. Like fat globules, WPC aggregates may be embedded in the casein network. These microparticulate WPC aggregates may act as non-interacting fillers in continuous protein matrix, also giving the matrix a spongy, porous appearance. Water holding capacity of the whey protein aggregates herein disclosed can protect cheese against proteolysis with high water retention in the cheese.

Since the whey protein aggregates may increase water retention, their use may increase cheese yield, such as by more than 10%. The whey protein aggregates according to one or more embodiments of the present disclosure may be used in soft cheeses, such as Fresh Mozzarella, Mozzarella, Italian type, Spanish type cheese. The whey protein aggregates according to one or more embodiments of the present disclosure may be used in other types of cheese, such as semi-hard and hard cheese.

Importantly, WPC aggregates are NOT limited to cheese production and application, but also for other products as functional ingredients in yogurt, for instance.

a. The present disclosure provides, in a first aspect, a process for forming whey protein aggregates, the process comprising heating a native whey protein solution with optional further components at a temperature between 90-92° C. for 10 minutes. Very little or no fouling/solid loss in the heat exchanger or heat tank is found in this aspect of the disclosure.

b. In a second aspect, the invention relates to obtaining a composition comprising whey protein aggregates by the process of the phase separation and concentration. High concentration of whey protein aggregates is undertaken. High speed of shearing device contributes to desired aggregate particle size. Forming the whey protein aggregates in this way allows for the generation of a wide variety of aggregate sizes and size distributions by altering the conditions such as heating, time, whey protein concentration, shear speed and rate.

c. In a further aspect, the invention relates to the use of the composition comprising whey protein aggregates as a protein and fat globule aggregates replacer in the cheese matrix. This contributes and increases the whey protein aggregates retention in cheese.

d. Water holding capacity protects the cheese against proteolysis with high water retention in the cheese, thereby preventing the cheese from developing a bitter flavor.

Methods of the invention are conveniently practiced by providing the compounds and/or compositions used in such method in the form of a kit. Such kit preferably contains the composition. Such a kit preferably contains instructions for the use thereof.

To gain a better understanding of the invention described herein, the following examples are set forth. It should be understood that these examples are for illustrative purposes only. Therefore, they should not limit the scope of this invention in anyway.

EXAMPLES

Process to aggregate whey protein

Figure 1:
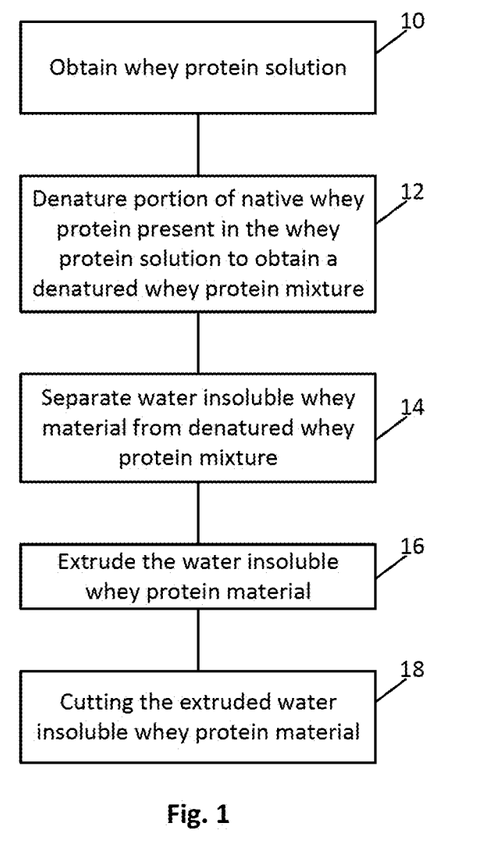
FIG. 1 shows a flowchart of a method in accordance with an embodiment of the present disclosure.

FIG. 1 shows a flowchart of an embodiment of a process or method to aggregate whey protein in accordance with the present disclosure. At action 10, a whey protein solution containing native whey protein may be obtained. At action 12, a portion of the native whey protein or all the native whey protein present in the whey protein solution may be denatured. Action 12 results in obtaining a denatured whey protein mixture, which may comprise water insoluble whey material. At action 14, some or all the water insoluble whey material is separated out of the denatured whey protein mixture. At action 16, the water insoluble whey material may be extruded. At action 18, the extruded insoluble whey protein material may be cut into whey protein aggregates.

The whey protein solution may be obtained in any suitable manner and may include several steps, some of which are described in the context of further examples below.

Denaturing some or all the native whey protein present in the whey protein solution may be carried out in any suitable manner, including the manners described in the context of further examples below.

Separating water insoluble whey protein material from the denatured whey protein mixture may be carried out in any suitable manner, including the manners described in the context of further examples below.

Extruding the water insoluble whey protein material may be carried out in any suitable manner, including the manners described in the context of further examples below.

Cutting the extruded water insoluble whey protein material into whey protein aggregates may be carried out in any suitable manner, including the manners described in the context of further examples below.

Example 1

Process Using Whey Protein Concentrate Powder

Figure 2:
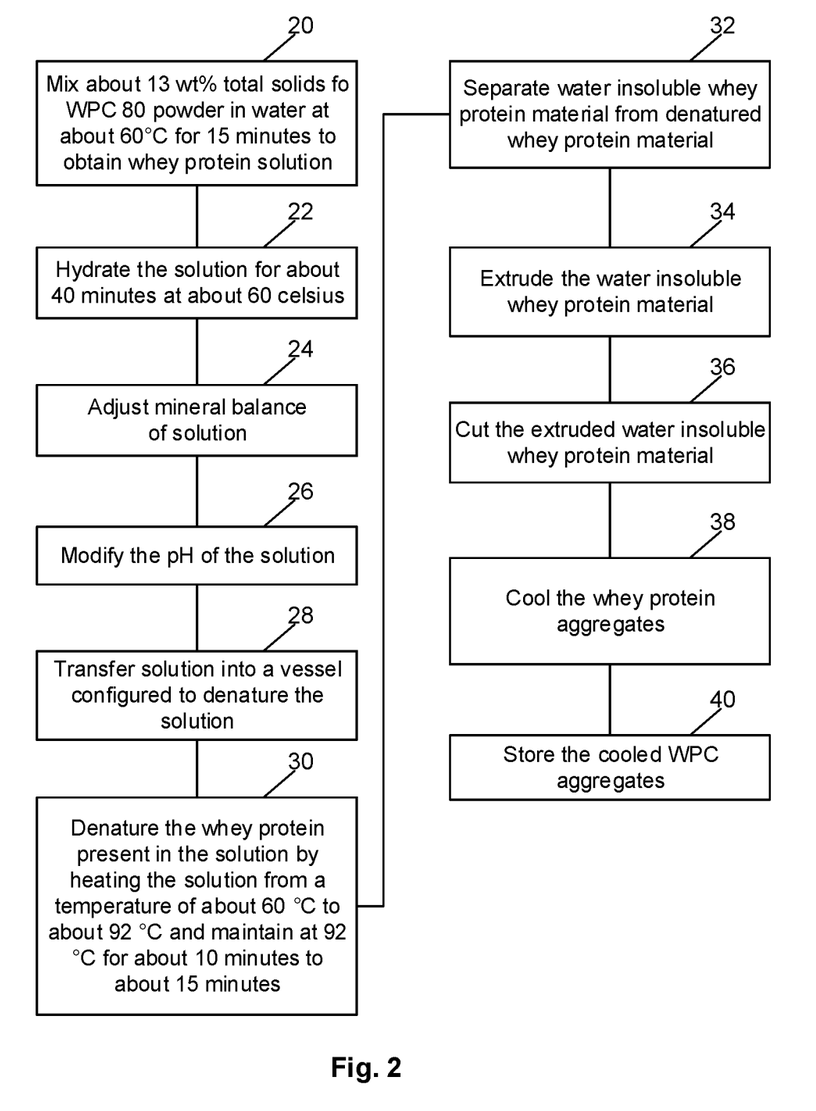
FIG. 2 shows a flowchart of a method in accordance with another embodiment of the present disclosure.

FIG. 2 shows a flowchart of another embodiment of a process or method to aggregate whey protein in accordance with the present disclosure.

At action 20, about 13% total solids of WPC 80 powder may be mixed in water at about 60° C. for about 15 minutes to obtain a whey protein solution. At action 22, the whey protein solution may be hydrated for about 40 minutes at about 60° C. At action 24, the mineral balance of the whey protein solution may be adjusted by adding thereto any suitable mineral. Such a mineral may include $CaCl_2$, which may be added to the whey protein solution in any suitable amount such as, for example, about 0.4%. At action 26, the pH of the whey protein solution may be adjusted in any suitable way such as, for example, by adding thereto any suitable pH adjusting elements. Such elements may include lactic acid in an amount sufficient to obtain a pH comprised between about 5.6 to about 6.2.

The method shown at FIG. 2 may include, at action 28, transferring the whey protein solution to a vessel configured to denature the whey protein solution. In some embodiments, the vessel may be configured to inject steam into the whey protein solution to heat the whey protein solution to denature the whey protein solution. In other embodiments, the vessel may be configured to transfer heat from the vessel itself to the whey protein solution present in the vessel. In some embodiments, this may be achieved by heating the vessel with any suitable heat jacket.

The method of FIG. 2 may also include, at action 30, denaturing a portion of the whey protein present in the whey protein solution, or all the whey protein present in the whey protein solution, to obtain a denatured whey protein mixture. Action 30 may be carried out by heating the whey protein solution to a temperature from about 60° C. to a temperature ranging from about 90° C. to about 92° C. for a duration of about 10 minutes to about 15 minutes, to obtain the denatured whey protein mixture. Heating the whey protein solution may be effected in any suitable manner such as, for example, by injecting steam directly into the whey protein solution.

At action 32 of the method of FIG. 2, the whey protein mixture may be subjected to a separation process to separate water insoluble whey protein material present in the whey protein mixture from the whey protein mixture. Any suitable separation process may be used such as, for example, a filtration process. The separation process may include transferring the whey protein mixture to a separation device, such as, for example, a filtration device. The separation device may be a cloth filter device, a mesh or screen separator device, a clarifier device, or a perforated conveyor belt.

At action 34 of the method of FIG. 2, the insoluble whey protein material may be extruded in any suitable manner, including using a food extrusion process. In some embodiments, extruding the insoluble whey protein material may include transferring the insoluble whey protein material to any suitable extrusion device.

At action 36, the extruded whey protein material may be cut into whey protein aggregates. Action 36 may include transferring the extruded whey protein material to any suitable cutting device, which, in some embodiments, may include a shear pump such as, for example, a multi-stage shear pump (e.g., a three-stage shear pump).

At action 38, the whey protein aggregates may be subjected to a cooling process to cool the whey protein aggregates to a target temperature such as, for example, about 10° C. At action 40, the cooled whey protein aggregates may be stored in a refrigerator device until use.

Hydration Process. In an embodiment of the present disclosure, whey protein concentrate (WPC 80 powder) was dissolved in water to a concentration of about 13% total solids and heated to 60° C. for 15 minutes. The mixture was then hydrated at 60° C. for 40 minutes in the presence of 0.4% $CaCl_2$ by weight, either in liquid form or powder.

pH Adjustment. Lactic acid was added to the hydrated whey protein solution in an amount sufficient to reach a pH of 5.8.

Denaturation Process. Steam was injected directly into the whey protein solution to heat the mixture from 60° C. to 92° C., and the temperature was held at 92° C. for 10-15 minutes.

Concentration. The denatured whey protein was concentrated by phase separation.

Transfer. For example by extrusion.

Processing. The concentrated, denatured whey protein was further processed by a shear pump with 3 stages at 3500-5000 rpm to achieve a desired particle size (micrometer particle size). In other embodiments, an in-line homogenizer can be used to obtain the desired particle size.

Cooling. The whey protein aggregates formed in the processing step were collected and processed in a cooling system to reduce the temperature to about 10° C.

Storage. The cooled whey protein aggregates were stored at a refrigerated temperature.

Example 2

Process Using Whey Protein Retentate

Figure 3:
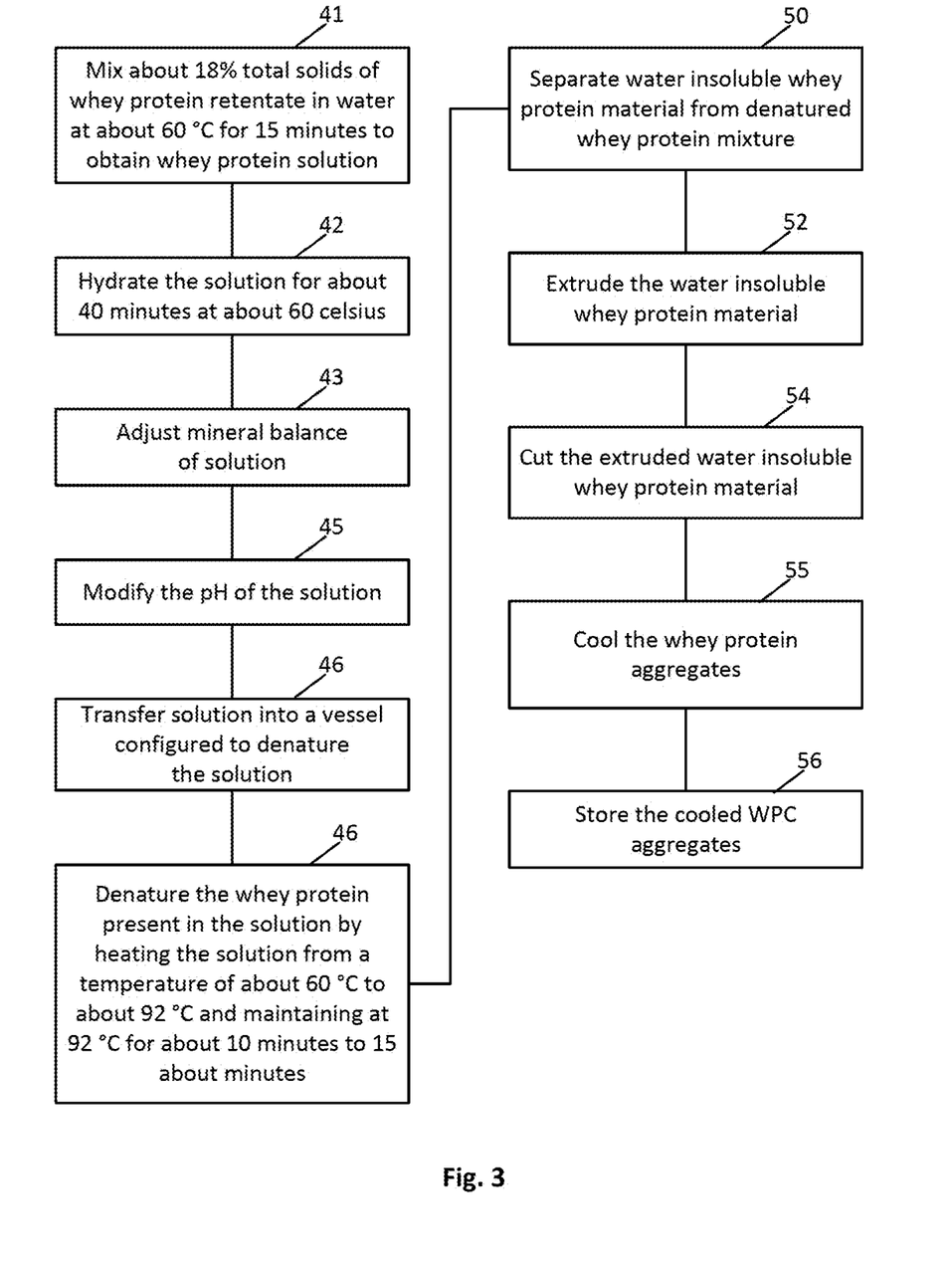
FIG. 3 shows a flowchart of a method in accordance with yet another embodiment of the present disclosure.

FIG. 3 shows a flowchart of another embodiment of a process or method to aggregate whey protein in accordance with the present disclosure.

At action 41, about 18% total solids of whey protein retentate may be mixed in water at about 60° C. for about 15 minutes to obtain a whey protein solution. At action 42, the whey protein solution may be hydrated for about 40 minutes at about 60° C. At action 43, the mineral balance of the whey protein solution may be adjusted by adding thereto any suitable mineral. Such a mineral may include $CaCl_2$, which may be added to the whey protein solution in any suitable amount such as, for example, about 1400 ppm to about 1600 ppm. At action 45, the pH of the whey protein solution may be adjusted in any suitable way such as, for example, by adding thereto any suitable pH adjusting elements. Such elements may include lactic acid in an amount sufficient to obtain a pH comprised between about 5.6 to about 6.2.

The method shown at FIG. 3 may also include, at action 46, transferring the whey protein solution to a vessel configured to denature the whey protein solution. In some embodiments, the vessel may be configured to inject steam into the whey protein solution to heat the whey protein solution to denature the whey protein solution. In other embodiments, the vessel may be configured to transfer heat from the vessel itself to the whey protein solution present in the vessel. In some embodiments, this may be achieved by heating the vessel with any suitable heat jacket.

The method of FIG. 3 may also include, at action 46, denaturing a portion of the whey protein present in the whey protein solution, or all the whey protein present in the whey protein solution, to obtain a denatured whey protein mixture. Action 46 may be carried out by heating the whey protein solution to a temperature from about 60° C. to a temperature ranging from about 90° C. to about 92° C. for a duration of about 10 minutes to about 15 minutes, to obtain the denatured whey protein mixture. Heating the whey protein solution may be effected in any suitable manner such as, for example, by injecting steam directly into the whey protein solution.

At action 50 of the method of FIG. 3, the whey protein mixture may be subjected to a separation process to separate water insoluble whey protein material present in the whey protein mixture from the whey protein mixture. Any suitable separation process may be used such as, for example, a filtration process. The separation process may include transferring the whey protein mixture to a separation device, such as, for example, a filtration device. The separation device may be a cloth filter device, a mesh or screen separator device, a clarifier device, or a perforated conveyor belt.

At action 52 of the method of FIG. 3, the insoluble whey protein material may be extruded in any suitable manner, including using a food extrusion process. In some embodiments, extruding the insoluble whey protein material may include transferring the insoluble whey protein material to any suitable extrusion device.

At action 54, the extruded whey protein material may be cut into whey protein aggregates. Action 54 may include transferring the extruded whey protein material to any suitable cutting device, which, in some embodiments, may include a shear pump such as, for example, a multi-stage shear pump (e.g., a three-stage shear pump).

At action 55, the whey protein aggregates may be subjected to any suitable cooling process to cool the whey protein aggregates to a target temperature such as, for example, about 10° C. At action 56, the cooled whey protein aggregates may be stored in any suitable refrigerator device until use.

Addition Process. To a whey protein retentate liquid base solution having a concentration of about 18% total solids was added 1400-1600 ppm of $CaCl_2$.

pH Adjustment. Lactic acid was added to the whey protein solution in an amount sufficient to reach a pH of 5.8.

Denaturation Process. Steam was injected directly into the whey protein solution to heat the mixture from 60° C. to 92° C., and the temperature was held at 92° C. for 10-15 minutes.

Concentration. The denatured whey protein was concentrated by phase separation.

Processing. The concentrated, denatured why protein was further processed by shear pump with 3 stages at 3500-5000 rpm to achieve a desired particle size.

Cooling. The whey protein aggregates formed in the processing step were collected and processed in a cooling system to reduce the temperature to about 10° C.

Storage. The cooled whey protein aggregates were stored at a refrigerated temperature.

Example 3

Whey Protein Aggregate Product Analysis

Whey protein aggregates were prepared according to the process of Example 1. The whey protein aggregates were determined to have the following composition:
fat (0.5-2%);
moisture (65-85%);
protein (10-20%);
total solid (15-30%),
wherein the percentages are wt/wt % based on the total weight of the whey protein aggregate composition.

The whey protein aggregates were used in a cheesemaking process, as follows.

Cheesemaking Process.

Figure 4:
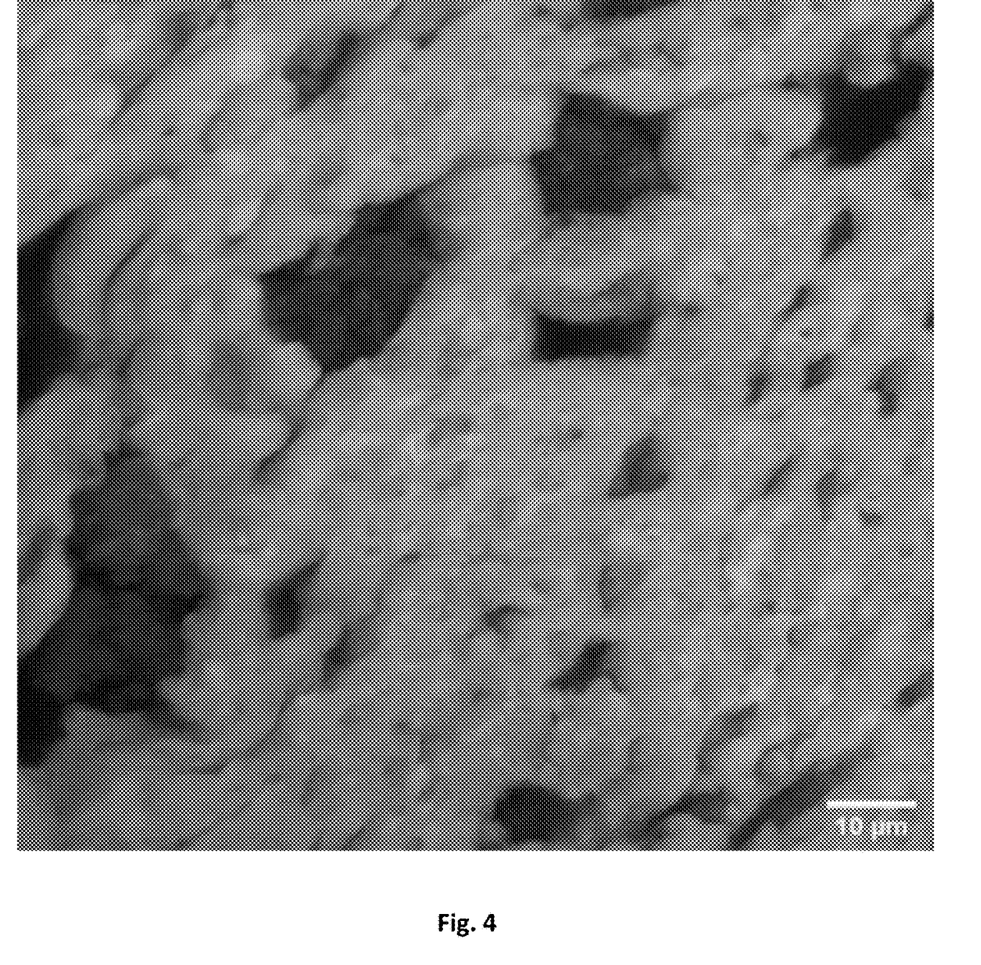
FIG. 4 shows an image of whey protein aggregates distributed in a cheese protein matrix prepared in accordance with an embodiment of the present disclosure.

A series of cheese products were made using various concentrations of the whey protein aggregates. An exemplary image is provided in FIG. 4 showing the whey protein aggregates distributed homogeneously and continuously in the cheese protein. The whey protein aggregates can be seen as black areas in the image of FIG. 4.

A correlation was observed between the concentration of whey protein aggregates added to the cheese and the amount of whey protein aggregates imbedded in the cheese protein matrix; more whey protein aggregates added was associated with more whey protein aggregates being imbedded in the cheese protein matrix.

It was also observed that the length of time in the processing stage to form the whey protein aggregates (i.e. the shearing effect) had a positive effect on the retention of the aggregates and their homogeneous distribution in the cheese matrix. For example, a sample having an additional 3 minutes of mixing/shearing yielded higher retention and more homogeneous distribution in the cheese matrix.

The image of FIG. 4 demonstrates the particle size of an exemplary whey protein aggregate preparation ranges from about 0.9 μm to about 2.5 μm, or about 2 μm on average. This shows the effect of shearing, and the resulting particles are like fat globules. Indeed, similarly to fat globules, the whey protein aggregates shown in FIG. 4 are embedded in the casein network. Without wishing to be bound by any one theory, it is expected that the microparticulated whey protein aggregates in such a system act as non-interacting fillers in the continuous protein matrix, giving the matrix has a spongy, porous appearance.

Figure 5:
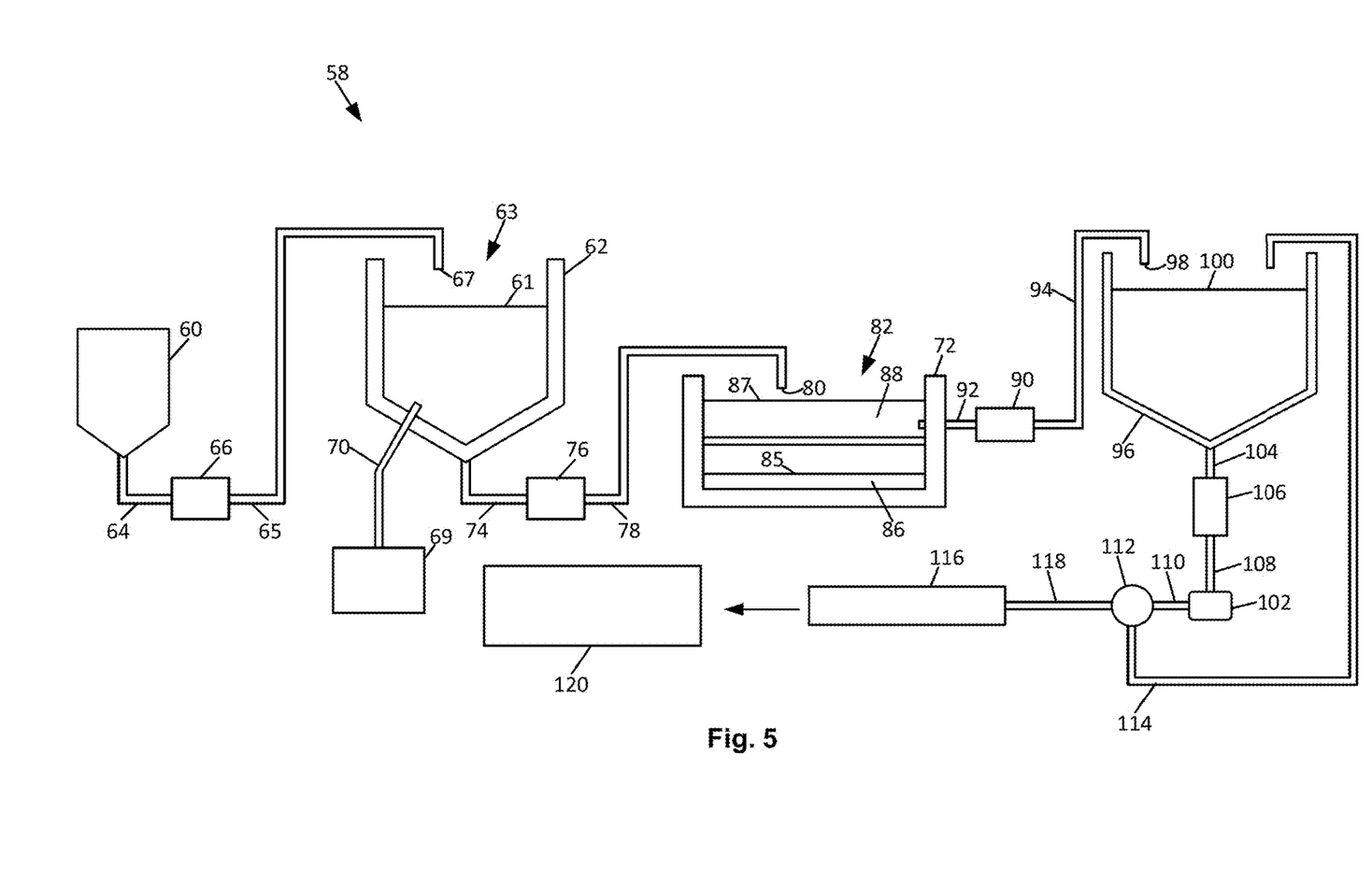
FIG. 5 shows a system in accordance with an embodiment of the present disclosure.

FIG. 5 shows an embodiment of a system 58 in accordance with the present disclosure. The system 58 may comprise a first tank unit (FTU) 60 in which whey components may be mixed with water to obtain a mixture that may have a total solids concentration of about 13 wt % to about 18 wt %. In some embodiments, the whey components may include WPC 80 and the total solids concentration of the mixture may be about 13 wt %. In other embodiments, the whey components may include whey protein retentate and the total solids concentration of the mixture may be about 18 wt %. In further embodiments, the whey components may include both WPC 80 and whey protein retentate, and the total solids concentration of the mixture may range from about 13 wt % to about 18 wt %. The water may be at a temperature of about 60° C.

In some embodiments, the FTU 60 may be used to hold the mixture during hydration of the mixture. The hydration may be conducted at a mixture temperature of about 60° C. and for a pre-determined period of time such as, for example, about 40 minutes.

In some embodiments, the FTU 60 may be used to hold the mixture during an addition of $CaCl_2$ to the mixture. Any suitable amount $CaCl_2$ may be added. In some embodiments, about 0.4 wt % of $CaCl_2$ may be added to the mixture.

In some embodiments, the FTU 60 may be used to hold the mixture, which may include $CaCl_2$, during an addition of lactic acid to the mixture. The amount of lactic acid may be selected to modify the pH of the mixture to obtain a pH of about 5.8.

The system 68 may further comprise a second tank unit (STU) 62 coupled to the FTU through conduits 64 and 65, and a first pump unit (FPU) 66. In operation, in some embodiments, when the mixture present in the FTU 60 has been hydrated, it may be transferred to the STU 62 by the FPU 66 pumping the mixture out from the FTU 60 though the conduit 64 and into the STU 62 through the conduit 65. According to embodiments, the mixture exits from an output end 67 of the conduit 64 and enters the STU 62 at a top opening 63 of the STU 62. The STU 62 is shown as being partially filled with the mixture 61.

In some embodiments, the STU 62 may be coupled to a steam generator 69. The STU 62 and the steam generator may be configured to transmit steam generated by the steam generator 69 from the steam generator 69 to the mixture 61 present in the STU 62. In some embodiments, the steam generator 69 may deliver steam to the mixture 61 through a conduit 70 coupling the steam generator 69 to the interior of the STU 62 and into the mixture 61 present in the STU 62. As mentioned above, the direct heating of the mixture by steam injection during heating and denaturation processes may be beneficial in that it may results is zero loss of mass in the equipment without fouling defects.

In some embodiments, when the mixture 61 is in the STU 62, protein present in the mixture 61 may be denatured by heating the mixture 61 to about 92° C. and by maintaining the mixture at about 92° C. for about 10 to 15 minutes. The heating of the mixture 61 may be performed directly by using steam, e.g., the steam generated by the steam generator 69. In other embodiments, the heating of the mixture 21 may be performed by heating the STU 62 and using the heated STU 22 to heat the mixture 21. For example, the STU 62 may include a heated jacket (not shown) though which circulates a heated fluid, which heats the interior wall of the STU 62, which heats the mixture 61.

The STU 62 may be coupled to a filter unit 72 through a conduit 74, a second pump unit (SPU) 76, and a conduit 78. In operation, in some embodiments, when protein in the mixture 21 present in the STU 62 has been denatured, it may be transferred to the filter unit 72 by the SPU 76 pumping the mixture 21 out from the STU 62 though the conduit 74 and into the filter unit 62 through the conduit 76. According to embodiments, the mixture exits from an output end 80 of the conduit 78 and enters the filter unit 72 at a top opening 82 of the filter unit 72.

In some embodiments, the filter unit 72 may include a cloth filter, a mesh separator, or a screen separator, which are represented in FIG. 3 by the rectangle 84. As the filtration of the mixture 21 occurs, the soluble materials 85 present in the mixture may pass through the cloth filter, the mesh separator, or the screen separator and fall to the bottom portion 86 of the filter unit 72. The insoluble material 87, present in the mixture, i.e., the whey protein, is retained at the top portion 88 of the filter unit 72.

In some embodiments, the top portion 88 of the filter unit 72 may be coupled to an extrusion pump 90 through a conduit 92. Extruding the whey protein 87 causes . . . . The extrusion pump 90 extrudes the whey protein to obtain extruded whey protein, which may be provided to a conduit 94, which outputs the extruded whey protein to a third tank unit (TTU) 96, through an output end 98 of the conduit 94. The extruded whey protein is shown in the TTU 96 at reference number 100.

In some embodiments, the extruded material 100 may be provided to a shearing unit 102, which may be coupled to the TTU 96 through a conduit 104, a third pump unit 106 and a conduit 108. In some embodiments, the shearing unit 102 may include multiple shearing stages. The shearing unit 102 outputs whey protein aggregates whose size may be controlled by design specifications and/or operating parameters of the shearing unit 102. Such design specifications may include the design of each shearing stage of the shearing unit 102, and the operating parameters may include the rotational speed of the shearing unit 102.

In some embodiments, when it is determined the size of the whey protein aggregates produced with a particular shearing unit 102 is too large or when a distribution of the sizes of the whey protein aggregates is too wide, the whey protein aggregates output from the shearing unit 102 to the conduit 110 may be provided back to the TTU 96 and subjected to an additional pass though the shearing unit 102. In some embodiments, a diverting valve 112 may be adjusted to provide the whey protein aggregates output form the conduit 110 to a conduit 114, which output the whey protein aggregates to the TTU 96. Although not shown, an additional pump may be used to provide the whey protein aggregates to the TTU 96. When the size of the whey protein aggregates produced with a particular shearing unit 102 is adequate and/or when a distribution of the sizes of the whey protein aggregates is adequate, the whey protein aggregates output from the shearing unit 102 to the conduit 110, the diverting valve may be set to provide the whey protein aggregates to a cooling system 116, through a conduit 118. In some embodiments, the system 58 may have a conveyor device instead of the conduit 118 and the whey protein aggregate output from the diverting valve 112 may be conveyed to the cooling system 116. In some embodiments, the cooling system 116 may include a cooled space though which the whey protein aggregates are conveyed for a target duration during which they may be cooled to any suitable temperature, such as about 10° C.

In some embodiments, when the size of the whey protein aggregates produced with a particular shearing unit 102 is known to be adequate and/or when a distribution of the sizes of the whey protein aggregates is know to adequate, the diverting valve 112 and the conduit may be omitted from the system.

In some embodiments, the cooled whey protein aggregates output from the cooling system 116 may be packaged in any suitable manner and the packaged whey protein aggregates may be stored in a refrigerated unit 120 until needed.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A process for aggregating whey protein, the process comprising:
   obtaining a whey protein solution containing native whey protein, the whey protein solution having a concentration of about 13 wt % to about 18 wt % total solids;
   adjusting a mineral balance of the whey protein solution by adding $CaCl_2$ to the whey protein solution;
   adjusting a pH of the whey protein solution to a pH value comprises between 5.6 and about 6.2;
   subsequent the adjusting the pH of the whey protein solution, denaturing at least a portion of the native whey protein present in the whey protein solution to obtain a denatured whey protein mixture, the denatured whey protein mixture containing water insoluble whey protein material, the denaturing of the at least a portion of the native whey protein present in the whey protein solution including heating the whey protein solution to a temperature from about 90° C. to about 92° C. for a duration of about 10 minutes to about 15 minutes;
   separating the water insoluble whey protein material from the denatured whey protein mixture by filtering the water insoluble whey protein material from the denatured whey protein mixture by using a cloth filter, a mesh or screen separator, a clarifier, or a perforated conveyor belt;
   extruding the water insoluble whey protein material to obtain extruded whey protein material; and
   cutting the extruded whey protein material to obtain whey protein aggregates.

2. The process of claim 1, wherein the obtaining the whey protein solution includes:
   preparing the whey protein solution by mixing whey protein concentrate powder in water to obtain the whey protein solution.

3. The process of claim 1, wherein the obtaining the whey protein solution includes:
   preparing the whey protein solution by mixing whey protein retentate in water to obtain the whey protein solution.

4. The process of claim 2 or claim 3, wherein mixing the whey protein solution is conducted for about 15 minutes at a temperature of about 60° C.

5. The process of claim 1, wherein the adding $CaCl_2$ to the whey protein solution includes the adding of about 0.4% wt % of the $CaCl_2$.

6. The process of claim 1, wherein the adding $CaCl_2$ to the whey protein solution includes the adding from about 1400 ppm to about 1600 ppm of the $CaCl_2$ to the whey protein solution.

7. The process of claim 1, wherein the adjusting the pH of the whey protein solution includes adding lactic acid to the whey protein solution.

8. The process of claim 1, further comprising hydrating the whey protein solution at a temperature of about 60° C. for a duration of about 20 minutes.

9. The process of claim 1, wherein the heating the whey protein solution includes directly injecting steam into the whey protein solution.

10. The process of any one of claims 1 to 3, wherein cutting the extruded whey protein material includes subjecting the whey protein material to a shearing process.

11. The process of claim 10, wherein the shearing process includes subjecting the extruded whey protein material to a first shearing step to obtain intermediate whey protein aggregates and subjecting the intermediate whey protein aggregates to a second shearing step to obtain the output whey protein aggregates, the output whey aggregates being smaller than the intermediate whey aggregates.

12. The process of any one of claims 1 to 3, further comprising cooling the whey protein aggregates to a temperature of about 10° C. to obtain cooled whey protein aggregates.

13. The process of claim 12, further comprising storing the whey protein aggregates.

* * * * *